US011584222B2

(12) United States Patent
Martin et al.

(10) Patent No.: US 11,584,222 B2
(45) Date of Patent: Feb. 21, 2023

(54) FUEL FILLER ACCESS CONTROL SYSTEM

(71) Applicant: Ford Global Technologies, LLC, Dearborn, MI (US)

(72) Inventors: David Martin, Dearborn, MI (US); Roshini Venkatesh, Canton, MI (US); Brent Edward Sealy, Canton, MI (US); Dennis Seung-Man Yang, Canton, MI (US); John Joseph Virga, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 539 days.

(21) Appl. No.: 16/449,784

(22) Filed: Jun. 24, 2019

(65) Prior Publication Data
US 2020/0398662 A1    Dec. 24, 2020

(51) Int. Cl.
*B60K 15/05*    (2006.01)
*B60K 15/04*    (2006.01)

(52) U.S. Cl.
CPC .......... *B60K 15/0406* (2013.01); *B60K 15/05* (2013.01); *B60K 2015/0419* (2013.01); *B60K 2015/0425* (2013.01); *B60K 2015/0429* (2013.01); *B60K 2015/0461* (2013.01); *B60Y 2200/92* (2013.01)

(58) Field of Classification Search
CPC .... B60K 15/04; B60K 15/0406; B60K 15/05; B60K 2015/0461; B60K 2015/0419; B60K 2015/0425; B60K 2015/0429; B60Y 2200/92
See application file for complete search history.

(56) References Cited

U.S. PATENT DOCUMENTS

| | | | | |
|---|---|---|---|---|
| 5,145,081 A | * | 9/1992 | Gravino | B60K 15/05 220/86.2 |
| 5,435,358 A | * | 7/1995 | Kempka | B60K 15/04 141/312 |
| 5,732,842 A | * | 3/1998 | Krause | B60K 15/05 141/383 |
| 5,901,760 A | * | 5/1999 | Parker | B60K 15/04 141/312 |
| 5,921,425 A | * | 7/1999 | Markey | B65D 47/265 220/254.4 |
| 6,539,990 B1 | * | 4/2003 | Levey | B60K 15/0406 141/301 |
| 6,994,130 B1 | * | 2/2006 | Gabbey | B60K 15/04 141/301 |
| 7,461,673 B2 | * | 12/2008 | Busch | B60K 15/0406 141/348 |
| 8,869,777 B2 | | 10/2014 | Espinoza | |
| 8,869,846 B2 | * | 10/2014 | Gerdes | B60K 15/04 141/350 |

(Continued)

*Primary Examiner* — Nicolas A Arnett
(74) *Attorney, Agent, or Firm* — David B. Kelley; Carlson, Gaskey & Olds, P.C.

(57) ABSTRACT

A vehicle assembly includes, among other things, a fuel inlet conduit configured to receive a fuel dispensing nozzle. The fuel inlet conduit opens to an inlet opening. A guard is configured to move back and forth between a blocking position that prevents insertion of the fuel dispensing nozzle through the inlet opening into the fuel inlet conduit, and an accessing position that permits insertion of the fuel dispensing nozzle through the inlet opening into the fuel inlet conduit.

18 Claims, 6 Drawing Sheets

(56) References Cited

U.S. PATENT DOCUMENTS

| | | | |
|---|---|---|---|
| 9,037,313 B2* | 5/2015 | Inoue | E05B 81/64 |
| | | | 701/2 |
| 9,228,541 B2* | 1/2016 | Pifher | F02M 25/0854 |
| 9,388,775 B2* | 7/2016 | Bolger | F02M 25/0836 |
| 9,415,682 B2* | 8/2016 | Aso | B60K 15/04 |
| 9,457,651 B2 | 10/2016 | Lindlbauer et al. | |
| 10,190,348 B2 | 1/2019 | Pearce et al. | |
| 10,240,542 B1 | 3/2019 | Salter et al. | |
| 2009/0056830 A1* | 3/2009 | Beier | B60K 15/0409 |
| | | | 141/350 |
| 2017/0174074 A1* | 6/2017 | Wakamatsu | B60K 15/03519 |

* cited by examiner

FUEL FILLER ACCESS CONTROL SYSTEM

TECHNICAL FIELD

This disclosure relates generally to a guard that can selectively block a fuel dispensing nozzle from being inserted into a fuel inlet conduit.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The fuel system of some vehicles, such as HEVs and PHEVs, can be a Non-Integrated Refueling Canister Only System (NIRCOS).

SUMMARY

A vehicle assembly according to an exemplary aspect of the present disclosure includes, among other things, a fuel inlet conduit configured to receive a fuel dispensing nozzle. The fuel inlet conduit opens to an inlet opening. A guard is configured to move back and forth between a blocking position that prevents insertion of the fuel dispensing nozzle through the inlet opening into the fuel inlet conduit, and an accessing position that permits insertion of the fuel dispensing nozzle through the inlet opening into the fuel inlet conduit.

A further embodiment of the foregoing assembly includes a fuel door moveable back and forth between an open position and a closed position.

A further embodiment of any of the foregoing assemblies includes a fuel door sensor configured to detect whether the fuel door is in the open position or the closed position, and a controller configured to initiate an adjustment to a pressure within a fuel tank in response to a reading from the fuel door sensor indicated that the fuel door is in the open position.

A further embodiment of any of the foregoing assemblies includes a filler valve disposed within the fuel inlet conduit.

In a further embodiment of any of the foregoing assemblies, the guard is configured to rotate between the blocking position and the accessing position.

In a further embodiment of any of the foregoing assemblies, the guard includes an aperture. The aperture is misaligned with the inlet opening when the guard is in the blocking position. The aperture is aligned with the inlet opening when the guard is in the accessing position.

A further embodiment of any of the foregoing assemblies includes an actuator that rotates the guard back and forth between the blocking position and the accessing position when the actuator is coupled to the guard. The guard is configured to be decoupled from the actuator to permit manual rotation of the guard from the blocking position to the accessing position.

In a further embodiment of any of the foregoing assemblies, the guard extends longitudinally along an axis, and the guard is configured to move along the axis when transitioning back and forth between the blocking position and the accessing position.

A further embodiment of any of the foregoing assemblies includes a solenoid configured to transition the guard from the blocking position to the accessing position, from the accessing position to the blocking position, or back and forth between the accessing position and the blocking position.

In a further embodiment of any of the foregoing assemblies, the guard is configured to be transitioned passively back and forth between the accessing position and the blocking position.

A further embodiment of any of the foregoing assemblies includes a biasing device. The guard is configured to be held in the blocking position when a pressure of a fuel tank is above a threshold value, and configured to be moved by the biasing device from the blocking position to the accessing position when the pressure of the fuel tank is at or below the threshold value.

A fuel filler access control method according to another exemplary aspect of the present disclosure includes, among other things, using a guard in a blocking position to prevent an inserting of a fuel dispensing nozzle through an inlet opening into a fuel inlet conduit that communicates fuel to a fuel tank of a vehicle. The method further includes transitioning the guard from the blocking position to an accessing position to permit insertion of the fuel dispensing nozzle through the inlet opening into the fuel inlet conduit.

A further embodiment of the foregoing method includes adjusting a pressure within the fuel tank from a first threshold value to a different, second threshold value, and transitioning the guard from the blocking position in response to the pressure reaching the second threshold value.

A further embodiment of any of the foregoing methods includes moving a fuel door from an open position to a closed position and initiating the adjusting in response to the moving.

A further embodiment of any of the foregoing methods includes inserting the fuel dispensing nozzle through the inlet opening into the fuel inlet conduit and pressing the fuel dispensing nozzle against a filler valve disposed within the fuel inlet conduit to open the filler valve.

A further embodiment of any of the foregoing methods includes rotating the guard from the blocking position to the accessing position.

In a further embodiment of any of the foregoing methods, the guard includes an aperture. The aperture is misaligned with the inlet opening when the guard is in the blocking position. The aperture is aligned with the inlet opening when the guard is in the accessing position.

A further embodiment of any of the foregoing methods includes rotating the guard back and forth between the blocking position and the accessing position using an actuator coupled to the guard. The actuator is configured to be decoupled from the actuator to permit manual rotation of the guard from the blocking position to the accessing position.

In a further embodiment of any of the foregoing methods, the guard extends longitudinally along an axis. The method further includes moving the guard along the axis when transitioning the guard back and forth between the blocking position and the accessing position.

A further embodiment of any of the foregoing methods includes passively transitioning the guard back and forth between the accessing position and the blocking position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to fuel systems and, more particularly, to a guard that can selectively block insertion of a fuel dispensing nozzle into a fuel inlet conduit of a vehicle. A customer can see the guard when in the blocking position and understand that access to the fuel inlet conduit is blocked.

Figure 1:
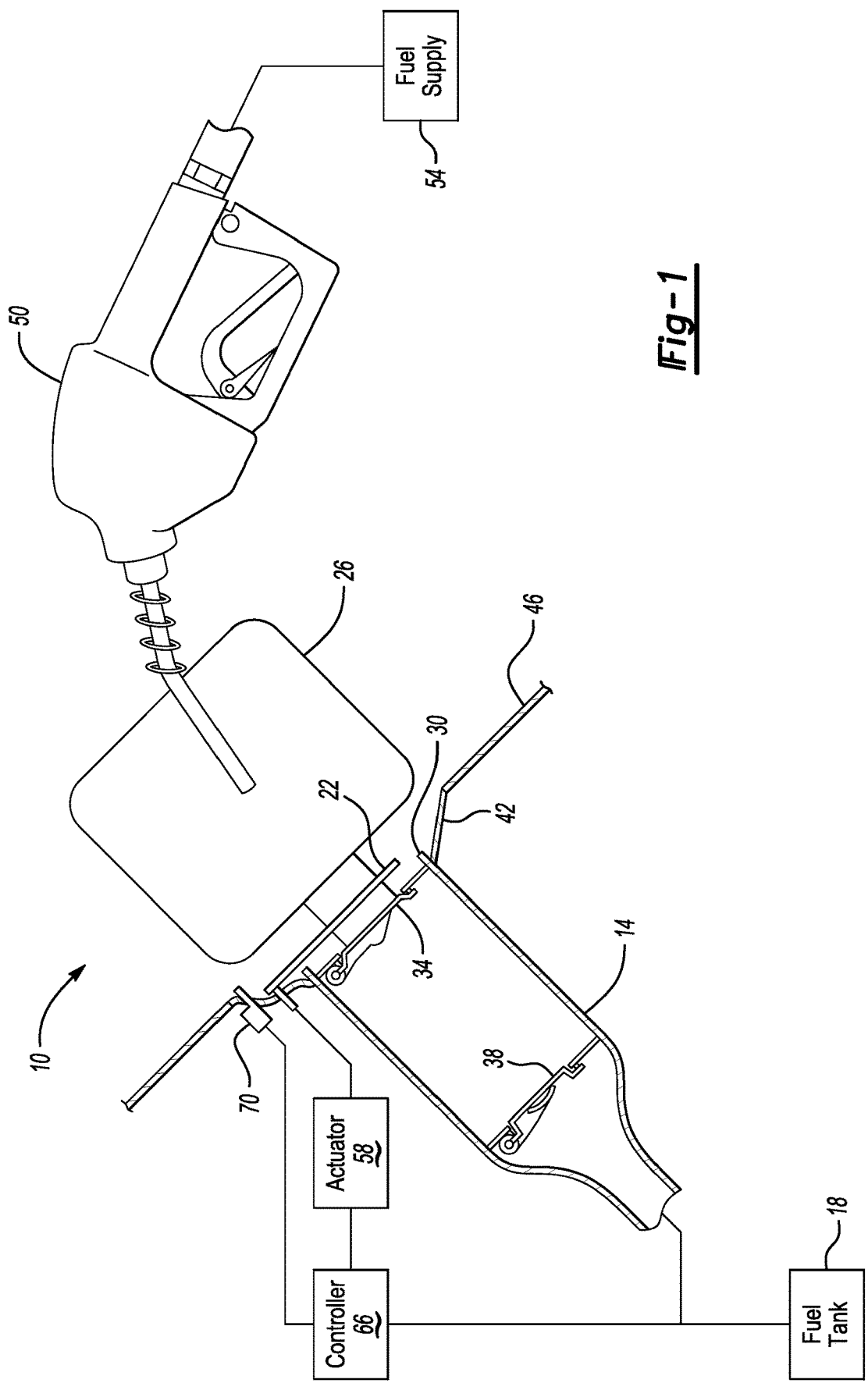
FIG. 1 illustrates a fuel dispensing nozzle and a partial section view of fuel system for a vehicle according to an exemplary aspect of the present disclosure.

A section view of selected portions of a fuel system 10 of a vehicle is shown in FIG. 1. The vehicle is a hybrid vehicle in this example. The exemplary fuel system 10 is a Non-Integrated Refueling Canister Only System (NIRCOS). As understood, the NIRCOS system can contain fuel vapors when a user is not refueling the vehicle. As understood, the NIRCOS system may necessitate raising or lowering pressures within the fuel system 10 prior to refueling.

The fuel system 10 includes a fuel inlet conduit 14, a fuel tank 18, a guard 22, and a fuel door 26. The fuel inlet conduit 14 opens to an inlet opening 30. The fuel inlet conduit 14 can extend from the inlet opening 30 to the fuel tank 18.

The fuel door 26 is shown in an open position in FIG. 1. When the fuel door 26 is rotated to a closed position, the fuel door 26 is substantially flush with the body panel 46. The guard 22 is disposed in front of the inlet opening 30 just behind the fuel door 26 when the fuel door 26 is in the closed position.

Within the fuel inlet conduit 14 are an outer door 34 and an inner door 38. The outer door 34 and the inner door 38 are both biased to the closed position as shown in FIG. 1. The outer door 34 and the inner door 38 are spring-biased in the exemplary embodiment.

A housing 42 circumferentially surrounds the inlet opening 30. The housing 42 extends from the fuel inlet conduit 14 to the body panel 46 of the vehicle to cover a gap between the fuel inlet conduit 14 and the body panel 46.

The fuel system 10 is a capless fuel system, which, for purposes of this disclosure, means that no cap is removably secured relative to the fuel inlet conduit 14 to seal and cover the inlet opening.

To refuel the fuel tank 18, a fuel dispensing nozzle 50 is inserted through the inlet opening 30. As the fuel dispensing nozzle 50 is inserted further into the fuel inlet conduit 14, the fuel dispensing nozzle 50 can press against the outer door 34 and, potentially, the inner door 38. This moves the outer door 34 from the closed position to an open position.

Fuel can then be delivered from a fuel supply 54 through the fuel dispensing nozzle 50 into the fuel inlet conduit 14 and ultimately into the fuel tank 18.

In the exemplary embodiment, the fuel system 10 is designed to retain fuel vapors to meet evaporative emissions requirements. As a result, the fuel system 10 can achieve vapor pressures and vacuum levels higher than conventional fuel systems.

The fuel system 10 can incorporate a pressure management system that ensures that a pressure within the fuel tank 18 is maintained within a particular threshold. Adjusting the pressure within the fuel tank 18 may be required prior to refueling utilizing the fuel dispensing nozzle 50.

If the pressure is too high, reducing the pressure may be needed prior to refueling to lessen the potential for fuel vapor escaping from the fuel system 10 through the inlet opening 30. If the pressure is too low, increasing the pressure may be required prior to refueling to lessen the potential for a vacuum drawing contaminants into the fuel system through the inlet opening 30. In some examples, adjusting the pressure within the fuel tank 18 can require from three to fifteen seconds. After the adjusting, the user can begin to refuel.

Figure 2:
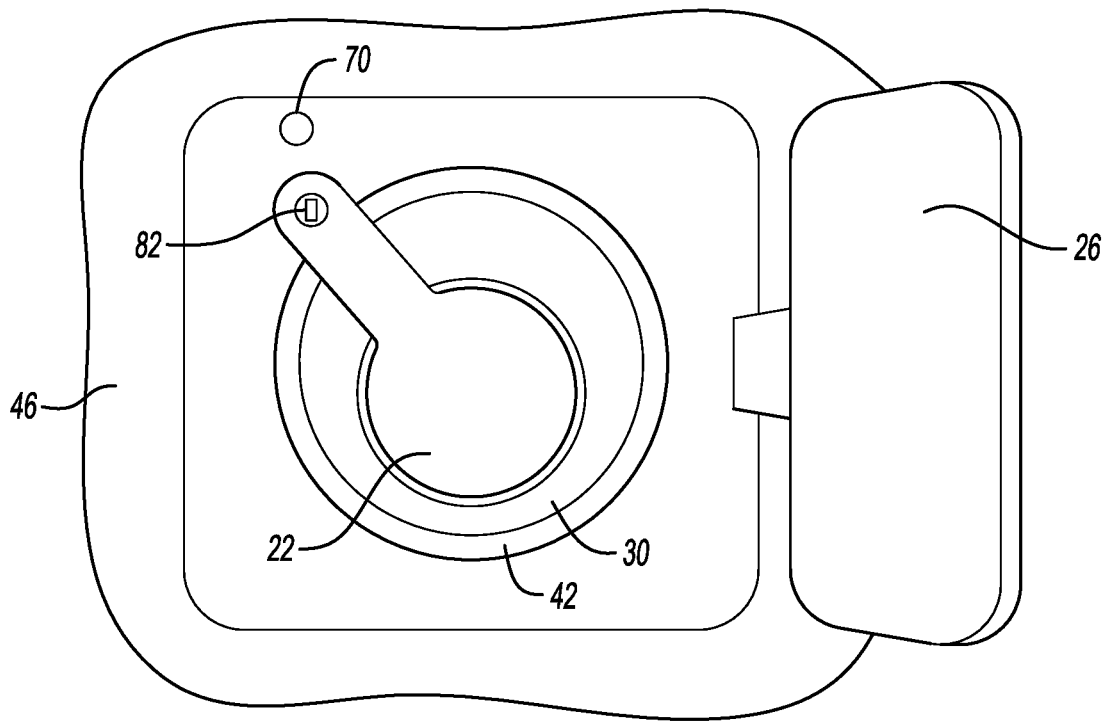
FIG. 2 illustrates a front view showing a guard of the fuel system in a blocking position.

The guard 22 is shown in FIGS. 1 and 2 in a blocking position where the guard 22 blocks insertion of the fuel dispensing nozzle 50 into the inlet opening 30. The guard 22 can block insertion of the fuel dispensing nozzle 50 until the fuel system 10 is within an acceptable pressure range. The guard 22 is visible to the user, which helps the user understand that refueling is not yet permitted. In some examples, a light could be incorporated near or within the guard 22. The light can change from red to green for example as the guard moves from the blocking position to the accessing position. This can further help the user to understand when the refueling is permitted.

Figure 3:
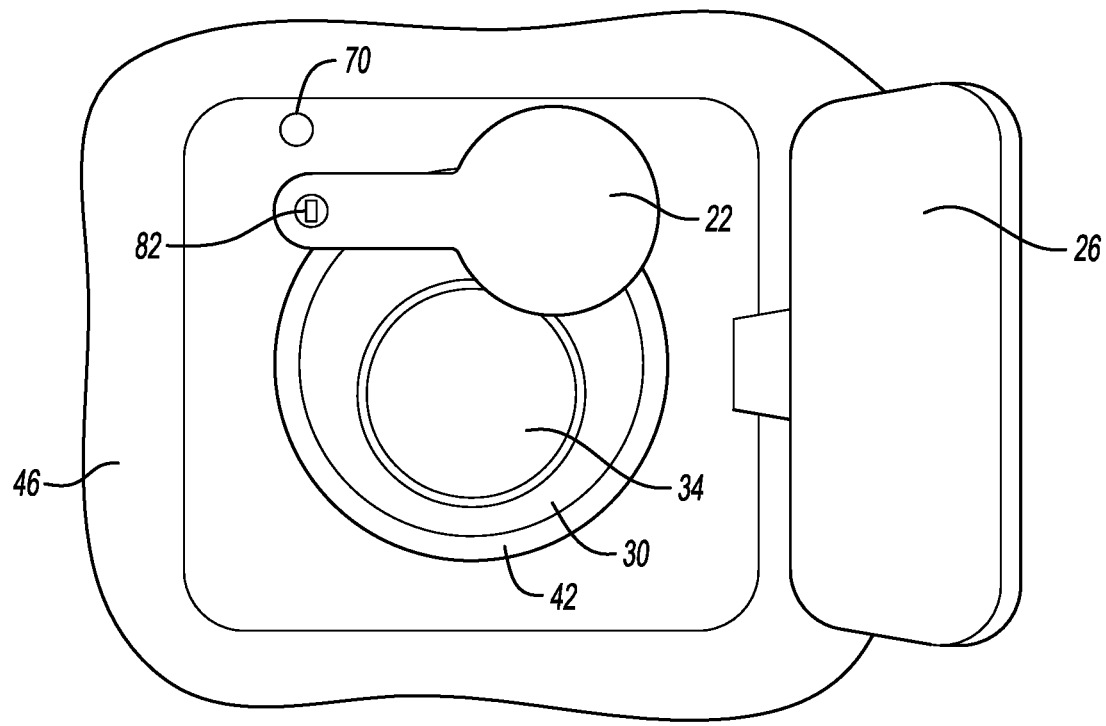
FIG. 3 illustrates a front view showing the guard of FIG. 2 in an accessing position.

After the fuel system 10 adjusts the pressure to be within a range appropriate for refueling, an actuator 58 can be used to rotate the guard 22 from the blocking position of FIGS. 1 and 2 to the accessing position of FIG. 3. Movement of the actuator 58 can be controlled by a controller 66 that is operably linked to the fuel tank 18 or sensors that monitor a pressure of the fuel tank 18 and other areas of the fuel system 10.

In the exemplary embodiment, the controller 66 is operably linked to a door position sensor 70. Signals from the door position sensor 70 can provide inputs to the controller 66 indicating that the fuel door 26 is in an open position as shown in the FIGS. 1-3, or a closed position where the fuel door 26 is flush with the body panel 46.

The controller 66 interprets the fuel door 26 moving to the open position as indicating that the user desires to refuel the vehicle. In response to a signal from the fuel door sensor 70 indicating that the fuel door 26 has been moved to an open position, the controller 66 can initiate a depressurization or vacuum reduction routine to bring the pressure of the fuel tank 18 to be within a range acceptable for refueling.

In some examples, instead of relying on an opening of the fuel door 26, a user can press a button or otherwise inform the vehicle of the desire to refuel. In response, the fuel system 10 begin adjusting the pressure within the fuel tank 18 if the pressure is outside a threshold range.

After bringing the pressure within the preferred range, the controller 66 instructs the actuator 58 to rotate the guard 22 from the blocking position of FIG. 2 to the accessing position of FIG. 3. The controller 66 can also, of course, receive feedback about the position of the guard 22 (e.g., blocking position, accessing position, between the blocking and accessing position, etc.).

Notably, the guard 22 is disposed outside of the fuel inlet conduit 14, and outside the inlet opening 30. The guard 22 is thus highly visible to a user attempting to refill fuel the vehicle via the fuel dispensing nozzle 50. The high visibility of the guard 22 in the blocking position can help the user to understand that the fuel dispensing nozzle 50 cannot be inserted into the inlet conduit 14 through the inlet opening 30. The high visibility of the guard 22 in the accessing position can help the user to understand that the fuel dispensing nozzle 50 can be inserted into the inlet conduit 14 through the inlet opening 30.

The controller 66 of the vehicle can be a microcontroller unit (MCU). The controller 66 could include a single controller module, or selected portions of a plurality of different controller modules.

The controller 66 can include, among other things, a processor and a memory portion. The processor can be programmed to execute a program stored in the memory portion. The processor can be a custom made or commercially available processor, a central processing unit (CPU), an auxiliary processor among several processors associated with the controller 66, a semiconductor based microprocessor (in the form of a microchip or chipset) or generally any device for executing software instructions.

The memory portion can include any one or combination of volatile memory elements. Programs can be stored in the memory portion as software code and used to initiate, for example, a fuel tank depressurization and a transitioning of the blocker back and for the between the blocking position and the accessing position. The programs can include one or more additional or separate programs, each of which includes an ordered list of executable instructions for implementing logical functions associated with control of fuel system 10.

Figure 4:
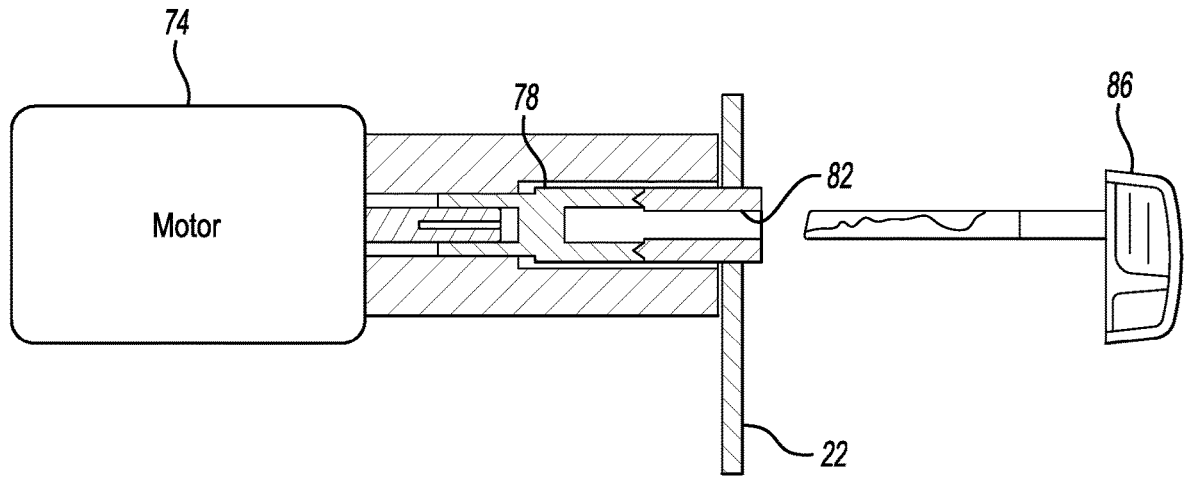
FIG. 4 illustrates a section view of the guard of FIG. 2 coupled to an actuator that can transition the guard back and forth between the blocking position and the accessing position.
Figure 5:
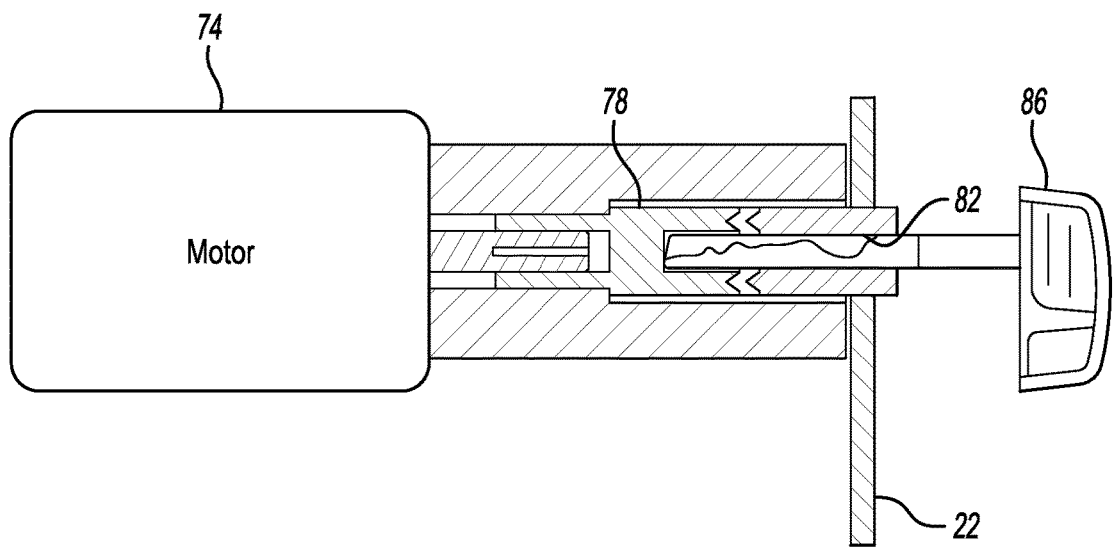
FIG. 5 illustrates the section view of the guard of FIG. 4 decoupled from the actuator.

With reference now to FIGS. 4 and 5, the actuator 58 that transitions the guard 22 can be a motor 74. A shaft 78 rotatably couples the motor 74 to the guard 22. The shaft 78 includes a keyhole 82 keyed to a key 86. The key 86, when inserted by the user into the keyhole 82, can be turned to separate portions of the shaft 78 such that the motor 74 is rotatably decoupled from the guard 22.

When the motor 74 is rotatably decoupled from the guard 22, the user can manually rotate the guard 22 between the blocking position of FIG. 2 and the accessing position of FIG. 3. Permitting the authorized decoupling of the guard 22 from the motor 74 can provide an override within the fuel system 10 permitting the user to rotate the guard 22 without relying on the motor 74.

Figure 6:
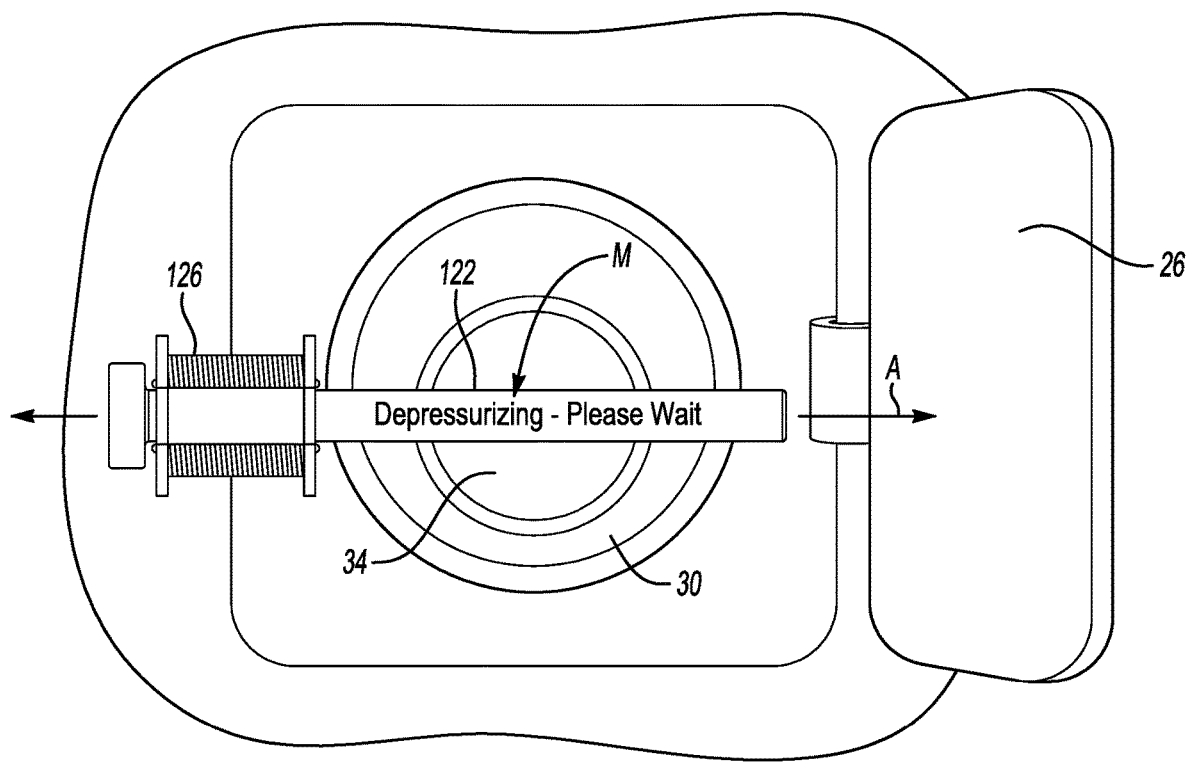
FIG. 6 illustrates a front view of portions of a fuel system according to another exemplary embodiment with a guard in a blocking position.
Figure 7:
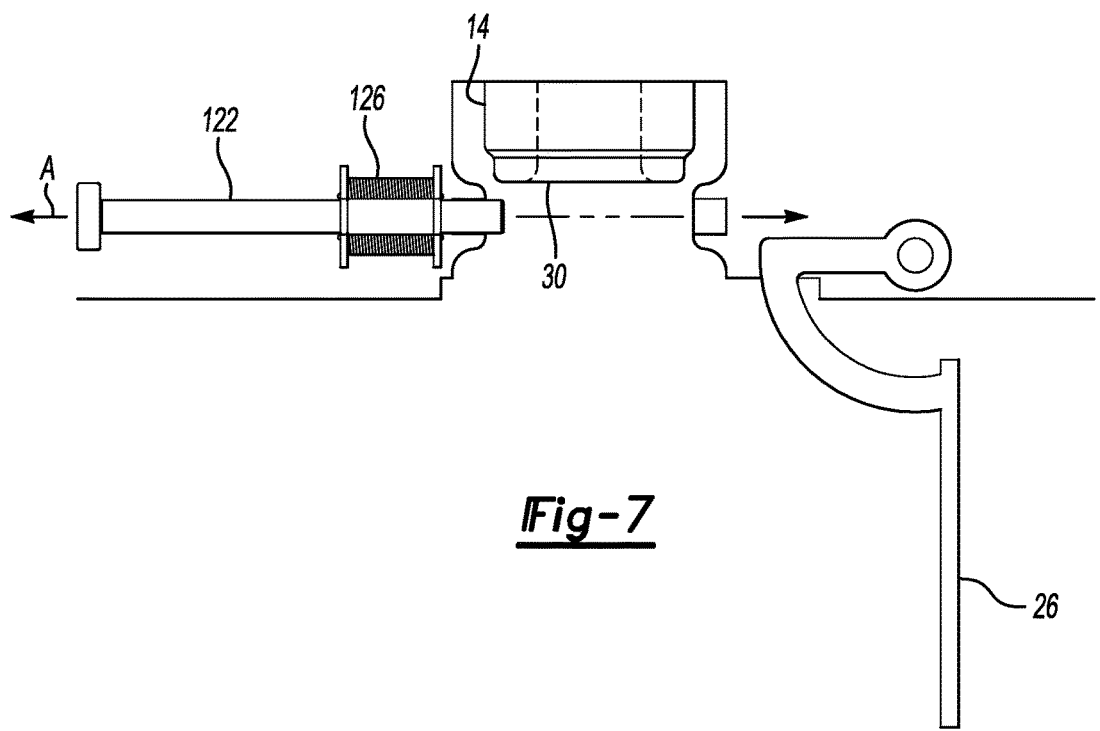
FIG. 7 illustrates a top section view of portions of the fuel system of FIG. 6 with the guard in an accessing position.

With reference now to FIGS. 6 and 7, a guard 122, according to another exemplary embodiment, extends longitudinally along an axis A. The guard 122 is configured to move along the axis A when transitioning back and forth between the blocking position of FIG. 6 and the accessing position of FIG. 7. The guard 122 can be driven along the axis A by an actuator, here a solenoid 126.

The guard 122 includes an indicator, here a message M, that the user can read when the guard 122 is in the blocking position of FIG. 6. The message M helps the user to understand that the user must wait before inserting the fuel dispensing nozzle 50 into the fuel inlet conduit 14.

Figure 8:
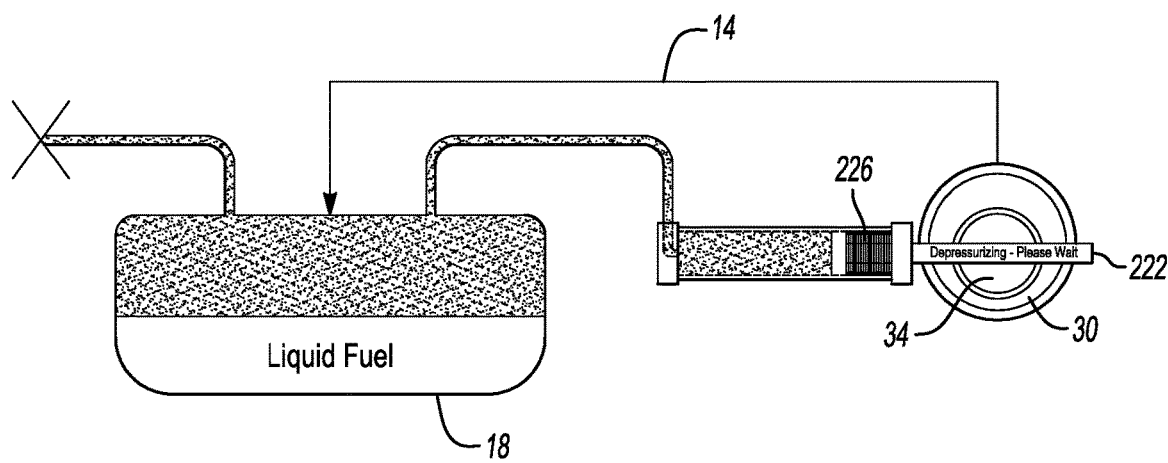
FIG. 8 illustrates a schematic front view of portions of a fuel system according to another exemplary embodiment having a guard in a blocking position.
Figure 9:
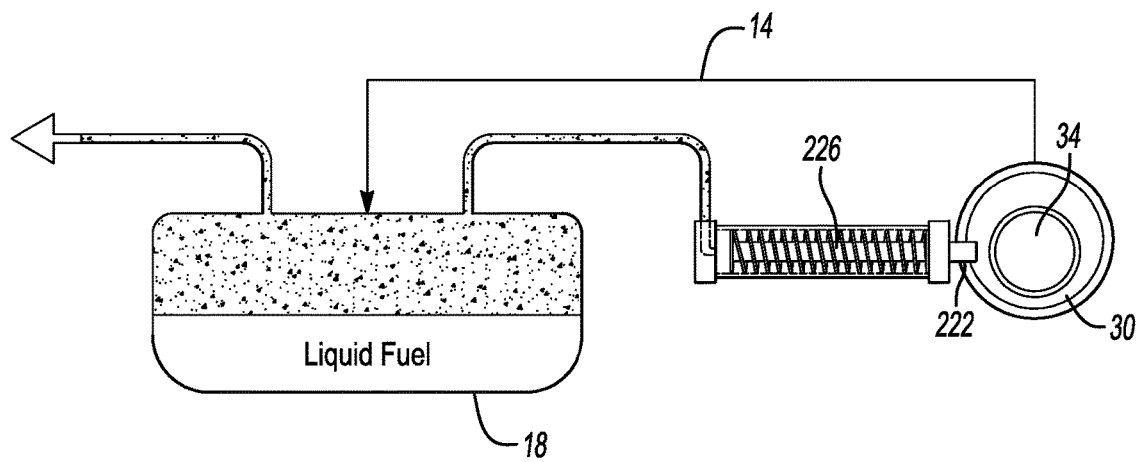
FIG. 9 illustrates the schematic front view of the portions of the fuel system of FIG. 8 with the guard in an accessing position.

A further embodiment is shown as a guard 222 in FIGS. 8 and 9. Like the guard 122, the guard 222 is transitioned along an axis A back and forth between the blocking position and the accessing position. Rather than the solenoid 126, however, the guard 222 is passively transitioned.

In the exemplary embodiment, when a pressure in the fuel tank 18 or another portion the fuel system 10 is above a threshold value, the pressure is used to hold the guard 222 in the blocking position of FIG. 8. When the pressure within the fuel tank 18 or another portion of the fuel system 10 is reduced as shown in FIG. 9, a biasing device 226 exerts a force on the guard 22 sufficient to move the guard 222 from the blocking position of FIG. 8 to the accessing position of FIG. 9. The biasing device 226 is a spring in this example.

Figure 10:
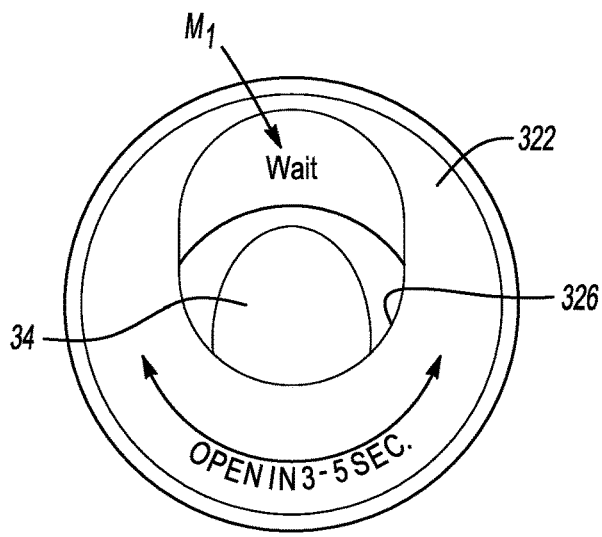
FIG. 10 illustrates a front view of a portion of a fuel system according to still another exemplary embodiment having the guard in a blocking position.
Figure 11:
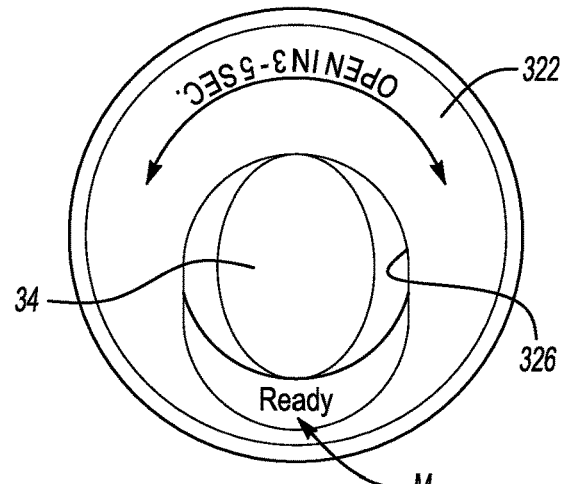
FIG. 11 illustrates the front view of the portion of the fuel system of FIG. 10 with the guard in an accessing position.

FIGS. 10 and 11 show a guard 322 according to yet another exemplary embodiment. The guard 322 includes an aperture 326 that is misaligned with the inlet opening 30 when in the blocking position of FIG. 10, and is aligned with the inlet opening 30 when in the accessing position of FIG. 11. An actuator, such as a motor, can be used to rotate the guard 322 back and forth between the blocking position and the accessing position. In some examples, the guard 322 provides a dust seal, or an additional dust seal for the area around the inlet opening 30.

When the guard 322 is in the blocking position, the aperture 326 is positioned such that a message $M_1$ can be viewed by the user indicating that insertion of the fuel dispensing nozzle 50 should be delayed. When the guard 322 is rotated such to the accessing position, the message $M_1$ is covered, and another message $M_2$ is revealed. The message $M_2$ informs the user that refueling can begin.

Figure 12:
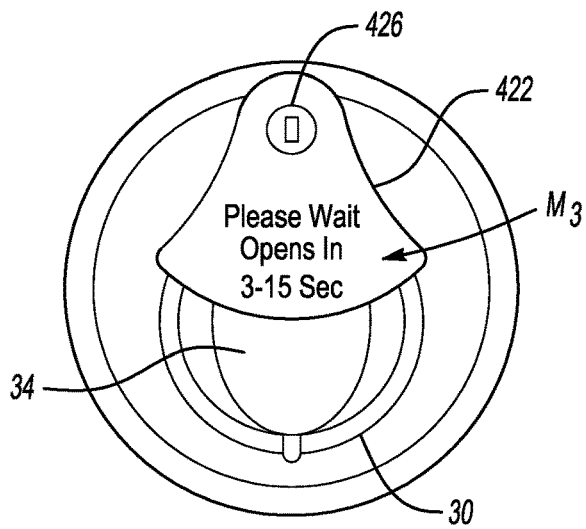
FIG. 12 illustrates a front view of a portion of a fuel system according to still another exemplary embodiment having the guard in a blocking position.
Figure 13:
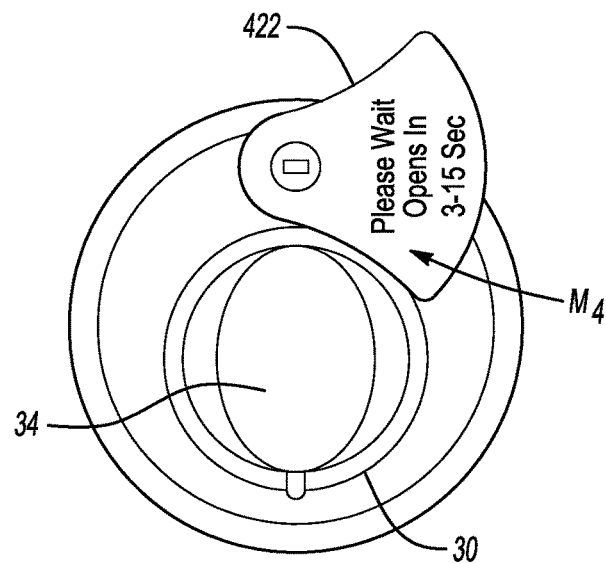
FIG. 13 illustrates the front view of the portion of the fuel system of FIG. 10 with the guard in an accessing position.

FIGS. 12 and 13 illustrate a guard 422 according to yet another exemplary embodiment. In this embodiment, the guard 422 includes a message $M_3$ indicating that the user should wait for the guard 422 to transition from the blocking position of FIG. 12 to the accessing position of FIG. 13.

The guard 422 pivots about a pivot point 426 back and forth between the blocking position and the accessing position. Notably, the pivot point 426 is configured to be positioned relatively close to the inlet opening 30, which can facilitate packaging the guard 422, particularly within capless fuel systems. The guard 422 also includes a keyhole near the pivot point 426. The keyhole can receive a key to permit a manual override as described above in connection with FIGS. 4 and 5. An actuator, such as a motor, can be used to pivot the guard 422 back and forth between the accessing position and the blocking position.

Various exemplary guards are taught in the foregoing embodiments. The guard can be, generally, any physical object that can block insertion of the fuel filler nozzle into the inlet opening.

Relying on the guard rather than, for example, the fuel door, can help to avoid triggering alerts. The fuel door can be left open, for example, but the guard can still be in the blocking position. There is thus no requirement that the fuel door be closed and reopen to reset the fuel system. The fuel door can be separated from other portions of the fuel system such that the fuel system can be sealed and blocked regardless the position of the fuel door.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
    a fuel inlet conduit configured to receive a fuel dispensing nozzle, the fuel inlet conduit opening to an inlet opening;
    a guard configured to move back and forth between a blocking position that prevents insertion of the fuel dispensing nozzle through the inlet opening into the fuel inlet conduit, and an accessing position that permits insertion of the fuel dispensing nozzle through the inlet opening into the fuel inlet conduit; and
    an actuator that rotates the guard back and forth between the blocking position and the accessing position when the actuator is coupled to the guard, the guard configured to be decoupled from the actuator to permit manual rotation of the guard from the blocking position to the accessing position.

2. The vehicle assembly of claim 1, further comprising a fuel door moveable back and forth between an open position and a closed position, further comprising a fuel door sensor configured to detect whether the fuel door is in the open position or the closed position, and a controller configured to initiate an adjustment to a pressure within a fuel tank in response to a reading from the fuel door sensor indicated that the fuel door is in the open position.

3. The vehicle assembly of claim 1, wherein the guard is configured to rotate between the blocking position and the accessing position, the guard configured to rotate about a pivot point that extends through a housing that circumferentially surrounds the inlet opening and extends from the fuel inlet conduit to a body panel of the vehicle to cover a gap between the fuel inlet conduit and the body panel.

4. The vehicle assembly of claim 3, wherein the guard includes an aperture, the aperture misaligned with the inlet opening when the guard is in the blocking position, the aperture aligned with the inlet opening when the guard is in the accessing position.

5. The vehicle assembly of claim 1, wherein the guard extends longitudinally along an axis, and the guard is configured to move along the axis when transitioning back and forth between the blocking position and the accessing position.

6. The vehicle assembly of claim 5, further comprising a solenoid configured to transition the guard from the blocking position to the accessing position, from the accessing position to the blocking position, or back and forth between the accessing position and the blocking position.

7. The vehicle assembly of claim 5, wherein the guard is configured to be transitioned passively back and forth between the accessing position and the blocking position.

8. The vehicle assembly of claim 7, further comprising a biasing device, wherein the guard is configured to be held in the blocking position when a pressure of a fuel tank is above a threshold value, and configured to be moved by the biasing device from the blocking position to the accessing position when the pressure of the fuel tank is at or below the threshold value.

9. The vehicle assembly of claim 1, further comprising a door within the inlet conduit, the door biased to a closed position, wherein the door is configured to move from the closed position to an open position when the fuel dispensing nozzle presses against the door.

10. The vehicle assembly of claim 1, wherein the guard is spaced a distance outward away from the inlet opening when the guard is in the blocking position.

11. A fuel filler access control method, comprising:
    using a guard in a blocking position to prevent an inserting of a fuel dispensing nozzle through an inlet opening into a fuel inlet conduit that communicates fuel to a fuel tank of a vehicle;
    transitioning the guard from the blocking position to an accessing position to permit insertion of the fuel dispensing nozzle through the inlet opening into the fuel inlet conduit; and
    rotating the guard back and forth between the blocking position and the accessing position using an actuator coupled to the guard,
    wherein the guard is configured to be decoupled from the actuator to permit manual rotation of the guard from the blocking position to the accessing position.

12. The fuel filler access control method of claim 11, further comprising adjusting a pressure within the fuel tank from a first threshold value to a different, second threshold value, and transitioning the guard from the blocking position in response to the pressure reaching the second threshold value.

13. The fuel filler access control method of claim 12, further comprising moving a fuel door from an open position to a closed position and initiating the adjusting in response to the moving.

14. The fuel filler access control method of claim 11, further comprising inserting the fuel dispensing nozzle through the inlet opening into the fuel inlet conduit and pressing the fuel dispensing nozzle against a filler valve disposed within the fuel inlet conduit to open the filler valve.

15. The fuel filler access control method of claim 11, further comprising rotating the guard from the blocking position to the accessing position, the rotating occurring while a door within an inlet opening of the inlet conduit remains in a closed position, wherein the door is configured to move from the closed position to an open position when the fuel dispensing nozzle presses against the door.

16. The fuel filler access control method of claim 15, wherein the guard includes an aperture, the aperture misaligned with the inlet opening when the guard is in the blocking position, the aperture aligned with the inlet opening when the guard is in the accessing position.

17. The fuel filler access control method of claim 11, wherein the guard extends longitudinally along an axis, and further comprising moving the guard along the axis when transitioning the guard back and forth between the blocking position and the accessing position.

18. The fuel filler access control method of claim 17, further comprising passively transitioning the guard back and forth between the accessing position and the blocking position.

* * * * *